(12) United States Patent
Sasaki et al.

(10) Patent No.: US 11,471,869 B2
(45) Date of Patent: Oct. 18, 2022

(54) HONEYCOMB STRUCTURE

(71) Applicant: NGK Insulators, Ltd., Nagoya (JP)

(72) Inventors: Yuji Sasaki, Nagoya (JP); Akifumi Kawakami, Nagoya (JP); Takashi Kinoshita, Nagoya (JP); Mitsuhiro Ito, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/816,895

(22) Filed: Mar. 12, 2020

(65) Prior Publication Data
US 2020/0306741 A1 Oct. 1, 2020

(30) Foreign Application Priority Data

Mar. 28, 2019 (JP) .............................. JP2019-063127

(51) Int. Cl.
*B01J 35/04* (2006.01)
*B01D 53/88* (2006.01)
*C04B 38/00* (2006.01)

(52) U.S. Cl.
CPC ............ *B01J 35/04* (2013.01); *B01D 53/885* (2013.01); *C04B 38/0009* (2013.01); *B01D 2255/92* (2013.01)

(58) Field of Classification Search
None
See application file for complete search history.

(56) References Cited

U.S. PATENT DOCUMENTS

| 2014/0205794 A1 | 7/2014 | Tamai et al. |
| 2016/0346776 A1 | 12/2016 | Omiya et al. |
| 2017/0080412 A1 | 3/2017 | Murata |

FOREIGN PATENT DOCUMENTS

| CN | 106029226 A | 10/2016 |
| CN | 106968766 A | 7/2017 |
| JP | 5708670 B2 | 4/2015 |

OTHER PUBLICATIONS

DeiselNet.com; Wall-Flow Monoliths, (2004), pp. 1-16 (Year: 2004).*
Chinese Office Action, Chinese Application No. 202010180255.6, dated Sep. 3, 2021 (6 pages).

* cited by examiner

*Primary Examiner* — Elizabeth Collister
(74) *Attorney, Agent, or Firm* — Burr & Brown, PLLC

(57) ABSTRACT

A honeycomb structure includes a pillar-shaped honeycomb structure body having a porous partition wall defining a plurality of cells serving as fluid through channel extending from an inflow end face to an outflow end face; and a circumferential wall surrounding the partition wall, wherein in a plane orthogonal to cell extending direction, the honeycomb structure body has a circumferential cell structure, a center cell structure having a cell structure different from the circumferential cell structure, and a boundary wall, the honeycomb structure body has intersection parts of the partition wall, including basic intersection parts and thick intersection parts having a thickness larger than that of the basic intersection parts, the thick intersection parts include at least one of: first thick intersection parts and second thick intersection parts, and in the circumferential cell structure, the intersection parts at least include the circumferential basic intersection parts.

9 Claims, 4 Drawing Sheets

HONEYCOMB STRUCTURE

The present application is an application based on JP 2019-063127 filed on Mar. 28, 2019 with Japan Patent Office, the entire contents of which are incorporated herein by reference.

BACKGROUND OF THE INVENTION

Field of the Invention

The present invention relates to honeycomb structures. More particularly the present invention relates to a honeycomb structure having a boundary wall separating two or more cell structures, and having excellent mechanical strength.

Description of the Related Art

Conventionally honeycomb structures loaded with catalyst have been used to purify toxic substances, such as HC, CO, and NOx, included in exhaust gas emitted from the engine of an automobile, for example. Honeycomb structures with plugging at open ends of the cells defined by a porous partition wall also are available, and these honeycomb structures are used for an exhaust-gas purifying filter.

A honeycomb structure is a pillar-shaped structure having a partition wall that defines a plurality of cells serving as a through channel of exhaust gas. Such a honeycomb structure has a cell structure made up of a plurality of cells that are arranged with a predetermined regular cycle in a plane orthogonal to the extending direction of the cells. Conventional honeycomb structures typically have a single-type cell structure in the plane. Recently honeycomb structures having two or more types of cell structures in the plane also have been proposed in order to improve the exhaust-gas purifying efficiency, for example. In one example, one of such honeycomb structures proposed has two or more types of cell structures in the plane orthogonal to the extending direction of the cells so that the cell density and the cell shape differ between a center part and a circumferential part in the plane.

For such a honeycomb structure having two or more different cell structures, a honeycomb structure having a porous boundary wall at the boundary part of these cell structures has been proposed. For such a honeycomb structure having a boundary wall, a technique has been proposed to partially increase the thickness of the partition wall at a predetermined range inside and outside of the boundary wall (see Patent Document 1, for example). For such a honeycomb structure, when the partition wall at a part other than the predetermined range inside and outside of the boundary wall is called a "basic partition wall" and the partition wall in the predetermined range is called a "reinforced partition wall", this honeycomb structure is configured so that the reinforced partition wall has a thickness larger than the basic partition wall has. Such a honeycomb structure can improve the strength while suppressing failures and defects of the shape of the partition wall.

[Patent Document 1] JP-B-5708670

SUMMARY OF THE INVENTION

Recently the followings have been examined in the related art for better efficiency of purifying performance and improved fuel economy performance, and the like. In one example, for better purifying performance, a honeycomb structure having a thinner partition wall defining the cells and having high cell density has been examined. For better fuel economy performance, a honeycomb structure having low cell density has been examined, which is to reduce the pressure loss of the honeycomb structure. The honeycomb structure described in Patent Document 1 has a problem that thinning of the partition wall as a whole and decreasing of the cell density greatly reduce the thermal shock resistance because the honeycomb structure fails to have a sufficient effect of improving the strength due to the reinforced partition wall.

A possible method of keeping enough strength of the honeycomb structure described in Patent Document 1 may be to increase the thickness of the reinforced partition wall. Such a method to increase the thickness of the reinforced partition wall, however, makes the open ends of the cells very small at a part close to the boundary partition wall, and this often causes the clogging of catalyst when the honeycomb structure is loaded with the catalyst. Especially for the honeycomb structure having quadrangular cells, the cells defined by the reinforced partition wall fail to be loaded with the catalyst uniformly. This causes accumulation of the catalyst at the corners of these cells, for example, and causes a failure in effective utilization of the loaded catalyst. The honeycomb structure described in Patent Document 1 therefore has a problem of having difficulty to achieve a thinner partition wall and higher cell density.

In view of such problems of the conventional techniques, the present invention provides a honeycomb structure having a boundary wall separating two or more cell structures, and having excellent mechanical strength and suppressing clogging of catalyst when the honeycomb structure is loaded with the catalyst.

The present invention provides the following honeycomb structure.

According to a first aspect of the present invention, a honeycomb structure is provided including:

a pillar-shaped honeycomb structure body having a porous partition wall defining a plurality of cells which serve as fluid through channels extending from an inflow end face to an outflow end face; and a circumferential wall disposed to surround the circumference of the partition wall, wherein in a plane orthogonal to an extending direction of the cells, the honeycomb structure body has a circumferential cell structure formed in a circumference of the honeycomb structure body, a center cell structure formed in a center part inside of the circumferential cell structure, the center cell structure having a cell structure different from the circumferential cell structure, and a boundary wall disposed at a boundary part between the circumferential cell structure and the center cell structure, the honeycomb structure body has intersection parts of the partition wall, the intersection parts including basic intersection parts and thick intersection parts, the thick intersection parts having a thickness of the intersection parts that is larger than a thickness of the basic intersection parts, the thick intersection parts include at least one of intersection parts including: first thick intersection parts in a range of distance L1 outward from the boundary wall, the first thick intersection parts being thicker than circumferential basic intersection parts that are the basic intersection parts in the circumferential cell structure; and second thick intersection parts in a range of distance L2 inward from the boundary wall, the second thick intersection parts being thicker than center basic intersection parts that are the basic intersection parts in the center cell structure, and in the circumferential cell structure, the intersection parts at least include the circumferential basic intersection parts that are the basic intersection parts.

According to a second aspect of the present invention, a honeycomb structure according to the first aspect is provided, wherein the thick intersection parts further include third thick intersection parts in a range of distance L3 toward a center from the circumferential wall, the third thick intersection parts being thicker than the circumferential basic intersection parts.

According to a third aspect of the present invention, the honeycomb structure according to the second aspect is provided, wherein in the circumferential cell structure, the range of the distance L3 is 70% or less of a length between the circumferential wall and the boundary wall in a perpendicular direction to the boundary wall.

According to a fourth aspect of the present invention, the honeycomb structure according to any one of the first to third aspects is provided, wherein the thick intersection parts further include fourth thick intersection parts in a range of distance L4 outward from a center of gravity O of a plane orthogonal to the extending direction of the cells, the fourth thick intersection parts being thicker than the center basic intersection parts.

According to a fifth aspect of the present invention, the honeycomb structure according to any one of the first to fourth aspects is provided, wherein in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, the honeycomb structure has intersection parts in the first thick intersection parts that have the intersection ratio of $C_{out}$, and has intersection parts in the second thick intersection parts that have the intersection ratio of $C_{in}$, and the $C_{out}$ and the $C_{in}$ satisfy the relationship of the following expression (1):

$$C_{out} < C_{in} \qquad \text{Expression (1)}$$

According to a sixth aspect of the present invention, the honeycomb structure according to a fifth aspect of the present invention is provided, wherein the honeycomb structure has intersection parts of the circumferential basic intersection parts that have the intersection ratio of $CB_{out}$, and has intersection parts of the center basic intersection parts that have the intersection ratio of $CB_{in}$, and the $CB_{out}$, the $C_{out}$, the $CB_{in}$, and the $C_{in}$ satisfy the relationship of the following expression (2):

$$CB_{out} < CB_{in} < C_{out} < C_{in} \qquad \text{Expression (2)}$$

According to a seventh aspect of the present invention, the honeycomb structure according to any one of the first to sixth aspects is provided, wherein in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, the intersection ratio of the thick intersection parts exceeds 2.2 and is 4.0 or less.

According to an eighth aspect of the present invention, the honeycomb structure according to any one of the first to seventh aspects is provided, wherein in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, and the intersection ratio of the basic intersection parts is 85% or less of the intersection ratio of the thick intersection parts in the same cell structure.

According to a ninth aspect of the present invention, the honeycomb structure according to any one of the first to eighth aspects is provided, wherein in the center cell structure, the range of the distance L2 is 35% or less of a radius of the center cell structure.

According to a tenth aspect of the present invention, the honeycomb structure according to any one of the first to ninth aspects is provided, wherein in the circumferential cell structure, the range of the distance L1 is 20% or less of a length between the circumferential wall and the boundary wall in a perpendicular direction to the boundary wall.

The honeycomb structure of the present invention has a boundary wall separating two or more cell structures, and has the advantageous effects of having excellent mechanical strength and suppressing clogging of catalyst when the honeycomb structure is loaded with the catalyst.

DESCRIPTION OF THE PREFERRED EMBODIMENTS

Figure 1:
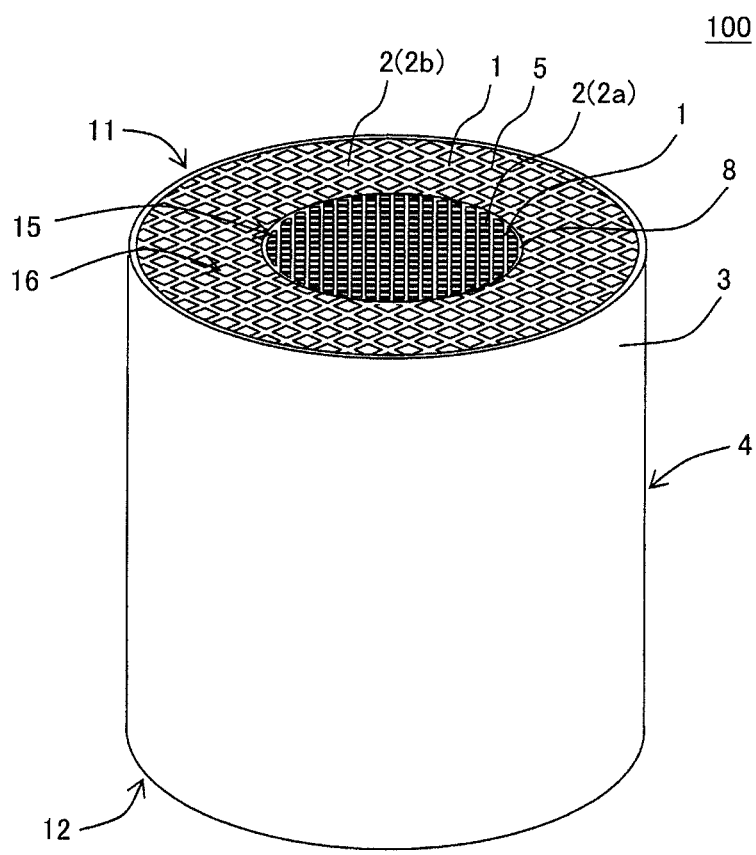
FIG. 1 is a perspective view schematically showing one embodiment of a honeycomb structure of the present invention.

The following describes embodiments of the present invention. However, the present invention is not limited to the following embodiments. The present invention is therefore to be understood to include the following embodiments, to which modifications and improvements are added as needed based on the ordinary knowledge of a person skilled in the art without departing from the scope of the present invention.

(1) Honeycomb Structure:

A honeycomb structure according to one embodiment of the present invention is a honeycomb structure 100 as shown in FIGS. 1 to 4. This honeycomb structure 100 includes a pillar-shaped honeycomb structure body 4 having a porous partition wall 1 and a circumferential wall 3 disposed so as to surround the circumference of this partition wall 1. The partition wall 1 of the honeycomb structure body 4 defines a plurality of cells 2 which serve as fluid through channel extending from an inflow end face 11 to an outflow end face 12.

Figure 2:
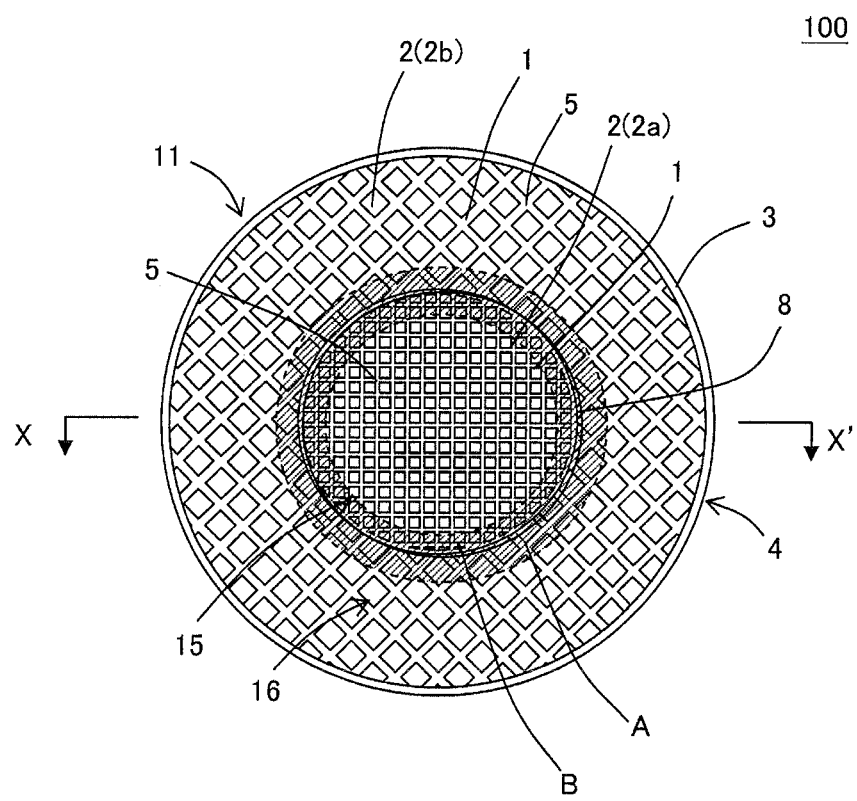
FIG. 2 is a plan view schematically showing the inflow end face of the honeycomb structure of FIG. 1.
Figure 3:
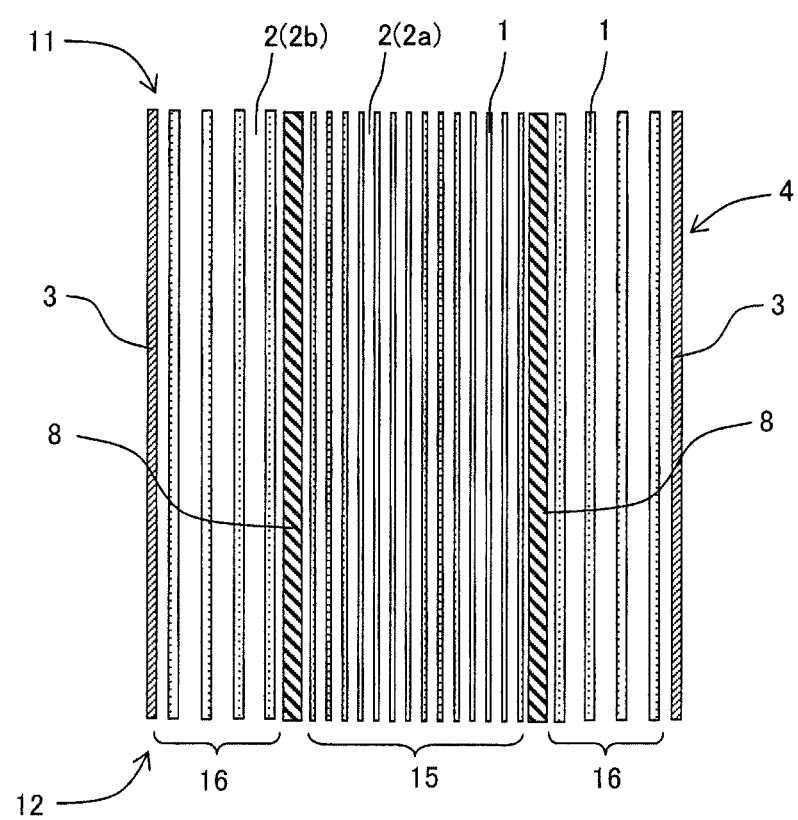
FIG. 3 is a sectional view schematically showing a section taken along the line X-X' of FIG. 2.
Figure 4:
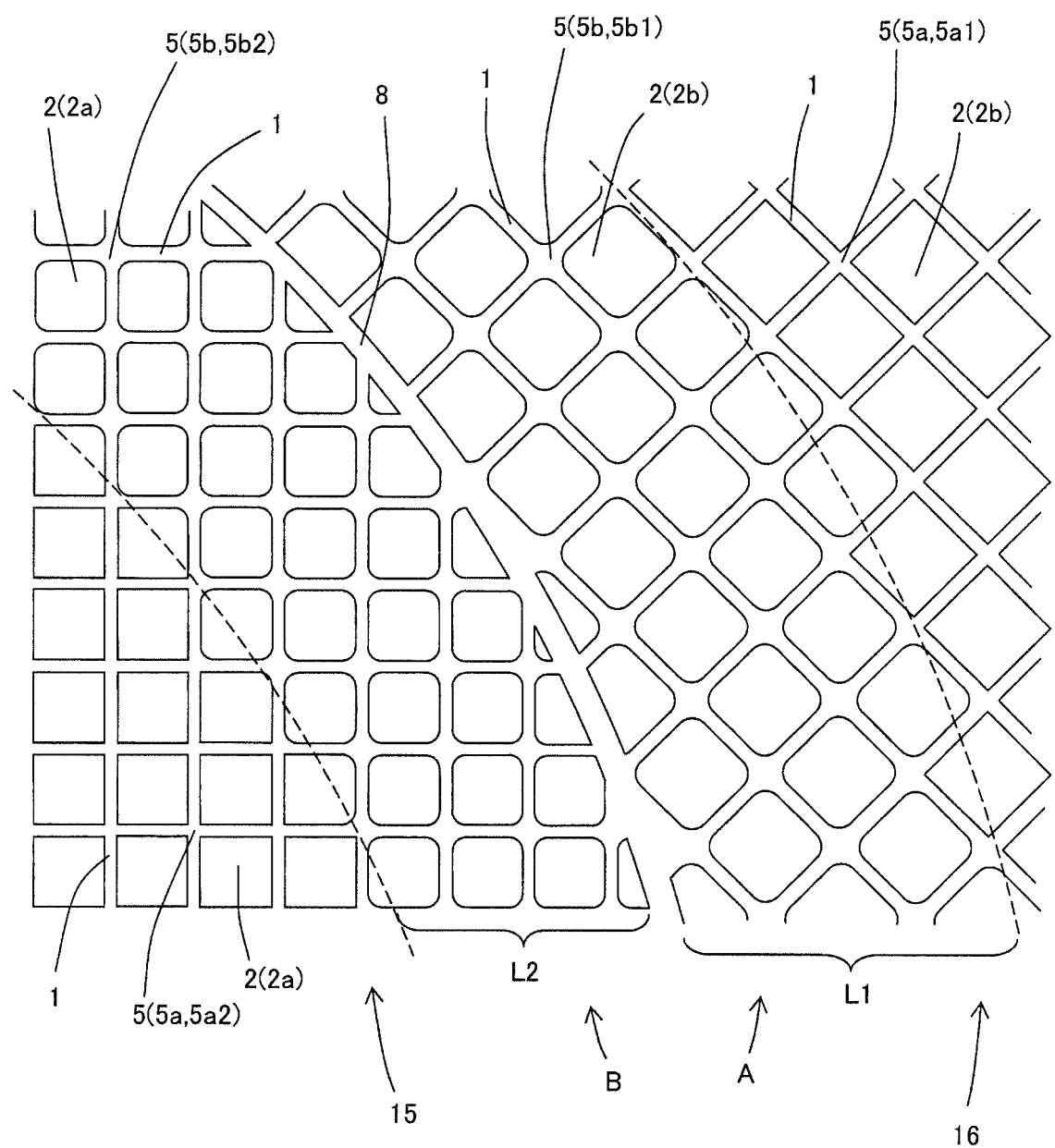
FIG. 4 is an enlarged plan view of a part of the first thick intersection parts and the second thick intersection parts in FIG. 2.

FIG. 1 is a perspective view schematically showing one embodiment of the honeycomb structure of the present invention. FIG. 2 is a plan view schematically showing the inflow end face of the honeycomb structure of FIG. 1. FIG. 3 is a sectional view schematically showing a section taken along the line X-X' of FIG. 2. FIG. 4 is an enlarged plan view of a part of first thick intersection parts and second thick intersection parts in FIG. 2.

The honeycomb structure 100 of the present embodiment has a feature that the honeycomb structure body 4 has the following configuration in the plane orthogonal to the extending direction of the cells 2. The honeycomb structure body 4 has a circumferential cell structure 16, a center cell structure 15, and a boundary wall 8 disposed at a boundary part between the circumferential cell structure 16 and the center cell structure 15. In this honeycomb structure body 4, the center cell structure 15 and the circumferential cell structure 16 have different cell structures. The center cell structure 15 refers to a structure made up of a plurality of cells 2a formed in a center part of the honeycomb structure body 4 in a plane orthogonal to the extending direction of the cells 2 of the honeycomb structure body 4. The circumferential cell structure 16 refers to a structure made up of a plurality of cells 2b formed in a circumference of the honeycomb structure body 4 in the plane. That is, the center cell structure 15 and the circumferential cell structure 16 are two regions separated by the boundary wall 8. The detailed structure of these center cell structure 15 and circumferential cell structure 16 are described later.

The honeycomb structure body 4 has intersection parts 5 of the partition wall 1, and the honeycomb structure 100 has a particularly important feature in that the intersection parts 5 have basic intersection parts 5a and thick intersection parts 5b that are thicker than the basic intersection parts 5a. These thick intersection parts 5b include the intersection parts 5 that are at least one of first thick intersection parts 5b1 and second thick intersection parts 5b2 described below. The "first thick intersection parts 5b1" are the thick intersection parts 5b in the range of distance L1 outward from the boundary wall 8 where the thickness of the intersection parts 5 are larger than the thickness of circumferential basic intersection parts 5a1 that are the basic intersection parts 5a of the circumferential cell structure 16. The "second thick intersection parts 5b2" are the thick intersection parts 5b in the range of distance L2 inward from the boundary wall 8 where the thickness of these intersection parts 5 are larger than the thickness of center basic intersection parts 5a2 that are the basic intersection parts 5a of the center cell structure 15. The honeycomb structure 100 has at least the circumferential basic intersection parts 5a1 that are the basic intersection parts 5a, in the circumferential cell structure 16.

The honeycomb structure 100 has the boundary wall 8 separating two or more cell structures, and has the advantageous effects of having excellent mechanical strength and suppressing clogging of catalyst when the honeycomb structure is loaded with the catalyst.

In the honeycomb structure 100, the shape of the thick intersection parts 5b is not limited especially as long as the thick intersection parts 5b have a thickness larger than the basic intersection parts 5a have. Preferably the partition wall 1 at parts other than the basic intersection parts 5a and the thick intersection parts 5b in the honeycomb structure 100 has a uniform thickness in the same cell structure. That is, when the honeycomb structure has both of the basic intersection parts 5a and the thick intersection parts 5b in the same cell structure, the cells 2 having the basic intersection parts 5a at the periphery and the cells 2 having the thick intersection parts 5b at the periphery preferably have the same shape except that they are different in shape of the parts corresponding to the thick intersection parts 5b.

In the plane orthogonal to the extending direction of the cells 2 of the honeycomb structure body 4, the diameter of a maximum inscribed circle that is imaginarily depicted in an intersection part 5 of the partition wall 1 is the width of the intersection part 5. For example, in this plane, the diameter of the maximum inscribed circle that is imaginarily depicted in a basic intersection part 5a is the width of the basic intersection part 5a. Similarly, in this plane, the diameter of the maximum inscribed circle that is imaginarily depicted in a thick intersection part 5b, such as a first thick intersection part 5b1 or a second thick intersection part 5b2, is the width of the thick intersection part 5b. The ratio of the width (i.e., the diameter of the maximum inscribed circle as stated above) of the intersection part 5 to the thickness of the partition wall 1 is an intersection ratio of the intersection part 5.

The honeycomb structure 100 may have the intersection parts 5 including the first thick intersection parts 5b1 that have the intersection ratio of $C_{out}$. The honeycomb structure 100 may have the intersection parts 5 including the second thick intersection parts 5b2 that have the intersection ratio of $C_{in}$. When the honeycomb structure 100 has the first thick intersection parts 5b1 and the second thick intersection parts 5b2 as stated above, $C_{out}$ and $C_{in}$ as stated above more preferably satisfy the relationship of the following expression (1):

$$C_{out} < C_{in} \qquad \text{Expression (1)}$$

The honeycomb structure 100 may have the intersection parts 5 including the circumferential basic intersection parts 5a1 that have the intersection ratio of $CB_{out}$. The honeycomb structure 100 may have the intersection parts 5 including the center basic intersection parts 5a2 that have the intersection ratio of $CB_{in}$. When the honeycomb structure 100 has the circumferential basic intersection parts 5a1 and the center basic intersection parts 5a2 as stated above, $CB_{out}$, $C_{out}$, $CB_{in}$ and $C_{in}$ as stated above particularly preferably satisfy the relationship of the following expression (2):

$$CB_{out} < CB_{in} < C_{out} < C_{in} \qquad \text{Expression (2)}$$

The intersection ratio of the thick intersection parts 5b preferably exceeds 2.2 and is 4.0 or less, and more preferably exceeds 2.3 and is 4.0 or less. Preferably the intersection ratio of the basic intersection parts 5a is 85% or less of the intersection ratio of the thick intersection parts 5b in the same cell structure. The width of the intersection parts 5 and the intersection ratio of the intersection parts 5 can be measured and calculated as follows. Firstly, in the plane orthogonal to the extending direction of the cells 2 of the honeycomb structure body 4, the plane is segmented into a region having the basic intersection parts 5a as the intersection parts 5 and a region having the thick intersection parts 5b as the intersection parts 5. In each of the regions, 2 points are selected at random from each of the following 4 ranges, and the width of the intersection part 5 and the thickness of the partition wall 1 are measured at the 8 points in total. The 4 measurement ranges in each region include, from the center of gravity of the honeycomb structure body 4, 2 ranges in the perpendicular direction to the partition wall 1, and 2 ranges in the 90° direction of the perpendicular direction. In one example, the 2 ranges in the perpendicular direction to the partition wall 1 are 2 ranges in the up-down direction from the center of gravity, and the 2 ranges in the 90° direction of the perpendicular direction are 2 ranges in the left-right direction from the center of gravity. The width of an intersection part 5 can be obtained by drawing an inscribed circle of the "intersection part 5 of the partition wall 1" to be measured and measuring the diameter of the maximum inscribed circle by image analysis. The thickness of the partition wall 1 also can be measured by image analysis as described above. Then the width of the intersection part 5 is divided by the thickness of the partition wall 1, and the average of the measurements at the above-stated 8 points is obtained. The value obtained in this way is the ratio of the width of the intersection part 5 to the thickness of the partition wall 1, i.e., the intersection ratio of the intersection part 5.

In the center cell structure 15, the range including the thick intersection parts 5b is preferably 35% or less of the radius of the center cell structure 15, and particularly preferably 5 to 20%. The range including the thick intersection parts 5b exceeding 35% of the radius of the center cell structure 15 is not preferable because such a honeycomb structure deteriorates in temperature-rising property due to the increased weight and increases in pressure loss due to lowering of the open frontal area.

In the circumferential cell structure 16, the range of distance L1 is preferably 20% or less of the length between the circumferential wall 3 and the boundary wall 8 in the perpendicular direction to the boundary wall 8, and particularly preferably 10 to 15%. The range of distance L1 exceeding 20% of the length between the circumferential wall 3 and the boundary wall 8 is not preferable, because such a honeycomb structure deteriorates in temperature-rising property due to the increased weight and increases in pressure loss due to lowering of the open frontal area. The range of distance L1 refers to the largest region including the cells 2 having one or more thick corners. This range does not include the cells 2 not being thick at every corner (i.e., the cells 2 that do not have a thick intersection part in the partition wall 1 surrounding it). The same goes for the other distances of distance L2, distance L3 and distance L4 described later.

The circumferential cell structure 16 of the present invention refers to a cell structure made up of the cells 2b located between the circumferential wall 3 and the boundary wall 8 of the honeycomb structure body 4. That is, the circumferential cell structure 16 can be a cell structure including complete cells formed at the outermost circumference of the honeycomb structure body 4. Hereinafter the cells 2 entirely surrounded and defined by the partition wall 1 may be referred to as "complete cells". On the other hand, the cells 2 that are not entirely surrounded and defined by the partition wall 1 and are partially defined by the circumferential wall 3 may be referred to as "incomplete cells". The cells 2 partially defined by the boundary wall 8 also may be referred to as "incomplete cells". The cells 2 formed in the honeycomb structure body 4 may be grouped into "complete cells" and "incomplete cells" as stated above.

The center cell structure 15 in the present invention refers to the cell structure made up of cells 2a located inside of the boundary wall 8. That is, the center cell structure 15 can be a cell structure including complete cells formed inside of the boundary wall 8 in the honeycomb structure body 4.

In the plane orthogonal to the extending direction of the cells 2, a single cell 2 defined by the partition wall 1 or the combination of a plurality of cells 2 is called a repeating unit. Then the "cell structure" refers to the structure including two or more of the repeating units. In one example, when the cells having the same cell shape are regularly arranged in the plane, the range including these cells having the same cell shape can be one cell structure. A plurality of cells having different cell shapes may be combined to constitute a single repeating unit. In this case, the range having such repeating units can be one cell structure. In the honeycomb structure 100 of the present embodiment, each of the center cell structure 15 and the circumferential cell structure 16 includes at least one type of cell structure.

The honeycomb structure 100 of the present embodiment has thick intersection parts 5b as stated above, and this means that the partition wall 1 may be partially thick near the intersection of the partition wall 1. The cell 2 defined by such a partition wall 1 may differ only at the part near the intersection from the shape of other cells 2 in the repeating unit. This description deals with such a cell 2 that differs only at the part of the thick intersection part 5b from the shape of other cells 2 in the repeating unit as one of the repeating unit.

In the present invention, two cell structures have "different cell structures" means that any one of the cell density and the shape of the cells 2 being different in comparison of these cell structures. "Being different in cell density" means that the comparison of two cell structures about their cell density shows a difference of 7 cells/cm$^2$ or more.

The shape of the cells 2 (hereinafter this may be called "cell shape") in a plane orthogonal to the extending direction of the cells 2 is not limited especially. For instance, the cells making up the center cell structure 15 and the circumferential cell structure 16 may have a polygonal shape, such as a triangle, a quadrangle, a hexagon, and an octagon. In each of the center cell structure 15 and the circumferential cell structure 16, the cells 2 may include one cell 2 and another cell 2 that are different in cell shape. The cells 2 including the thick intersection part 5b at the periphery have a shape without a part corresponding to the thick part at the corner of the cell shape as stated above.

Preferably in the honeycomb structure 100, the center cell structure 15 has cell density larger than the circumferential cell structure 16 has. Such a honeycomb structure 100 enables easy flow of exhaust gas into the circumferential cells 2 in the plane orthogonal to the extending direction of the cells 2, and is preferable because this configuration enables efficient contact of the exhaust gas with the honeycomb structure 100 for purifying.

The center cell structure 15 preferably has cell density of 40 to 155 cells/cm$^2$, more preferably 60 to 140 cells/cm$^2$, and particularly preferably 75 to 110 cells/cm$^2$. If the cell density of the center cell structure 15 is less than 40 cells/cm$^2$, such a honeycomb structure 100 may fail to keep the strength or may have difficulty in flowing of exhaust gas into the circumference. If the cell density in the center cell structure 15 exceeds 155 cells/cm$^2$, the pressure loss of the honeycomb structure 100 may increase, or when the honeycomb structure is loaded with catalyst, the cells 2 may be clogged with the loaded catalyst.

The circumferential cell structure 16 preferably has cell density of 15 to 95 cells/cm$^2$, more preferably 30 to 80 cells/cm$^2$, and particularly preferably 40 to 65 cells/cm$^2$. If the cell density in the circumferential cell structure 16 is less than 15 cells/cm$^2$, the strength of the honeycomb structure 100 may be insufficient. If the cell density in the circumferential cell structure 16 exceeds 95 cells/cm$^2$, the pressure loss of the honeycomb structure 100 may increase, or when the honeycomb structure is loaded with catalyst, the cells 2 may be clogged with the loaded catalyst.

The center cell structure 15 preferably has a basic partition-wall thickness of 0.05 to 0.21 mm, more preferably 0.05 to 0.16 mm, and particularly preferably 0.05 to 0.12 mm. The "basic partition-wall thickness" refers to the thickness of the partition wall 1 at a part other than the intersection parts 5. A too thin partition wall 1 in the center cell structure 15 is not preferable because such a honeycomb structure 100 may fail to keep the strength or may have difficulty in flowing of exhaust gas into the circumference. A too thick partition wall 1 in the center cell structure 15 is not preferable because the pressure loss of the honeycomb structure 100 may increase, or when the honeycomb structure is loaded with catalyst, the cells 2 may be clogged with the loaded catalyst.

The circumferential cell structure 16 preferably has a basic partition-wall thickness of 0.07 to 0.23 mm, more preferably 0.07 to 0.18 mm, and particularly preferably 0.07 to 0.15 mm. A too thin partition wall 1 in the circumferential cell structure 16 is not preferable because such a honeycomb structure 100 may fail to keep the strength or may have difficulty in flowing of exhaust gas into the circumference. A too thick partition wall 1 in the circumferential cell structure 16 is not preferable because the pressure loss of the honeycomb structure 100 may increase, or when the honeycomb structure is loaded with catalyst, the cells 2 may be clogged with the loaded catalyst.

The circumferential wall 3 preferably has a thickness of 0.1 to 0.8 mm, more preferably 0.2 to 0.7 mm, and particularly preferably 0.3 to 0.5 mm. A too thin circumferential wall 3 is not preferable because the mechanical strength of the honeycomb structure 100 as a whole deteriorates. A too thick circumferential wall 3 is not preferable because the opening area of the cells 2 reduces in the honeycomb structure 100, and the pressure loss of the honeycomb structure 100 may increase.

The boundary wall 8 preferably has a thickness of 0.1 to 0.8 mm, more preferably 0.2 to 0.7 mm, and particularly preferably 0.3 to 0.5 mm. A too thin boundary wall 8 is not preferable because the mechanical strength of the honeycomb structure 100 as a whole deteriorates. A too thick boundary wall 8 is not preferable because the opening area of the cells 2 reduces in the honeycomb structure 100, and the pressure loss of the honeycomb structure 100 may increase.

In the honeycomb structure 100 shown in FIG. 1 to FIG. 4, the orientation of the repeating units of the cells 2a in the center cell structure 15 is inclined relative to the orientation of the repeating units of the cells 2b in the circumferential cell structure 16. Specifically the repeating units of the cells 2a in the center cell structure 15 are arranged laterally on the sheet of FIG. 2. Meanwhile the repeating units of the cells 2b in the circumferential cell structure 16 are arranged in a direction inclined obliquely to the lateral direction of the sheet of FIG. 2. This configuration suppresses stress concentration to a specific part, and so leads to the effect of keeping the strength. The honeycomb structure 100 of the present embodiment may be configured so that the orientation of the repeating units of the cells 2a in the center cell structure 15 is parallel to the orientation of the repeating units of the cells 2b in the circumferential cell structure 16.

In the honeycomb structure 100, the angle between the orientation of the repeating units of the cells 2b in the circumferential cell structure 16 and the orientation of the repeating units of the cells 2a in the center cell structure 15 is not limited especially. When the orientation of the repeating units of the cells 2a in the center cell structure 15 is inclined relative to the orientation of the repeating units of the cells 2b in the circumferential cell structure 16, the angle of the inclination is preferably 10° or more and less than 50°. The inclination of the repeating units of the cells 2a and 2b in the orientation within such a range of the angle achieves the above-stated advantageous effects effectively. In one example, the orientation of the repeating units of the cells 2b in the circumferential cell structure 16 has the angle of 45° relative to the orientation of the repeating units of the cells 2a in the center cell structure 15 in the honeycomb structure 100 shown in FIG. 1 to FIG. 4.

The partition wall 1 of the honeycomb structure body 4 preferably has porosity of 10 to 55%, more preferably 20 to 45%, and particularly preferably 25 to 35%. If the porosity of the partition wall 1 is less than 10%, the pressure loss of the honeycomb structure 100 when using as a filter may increase. If the porosity of the partition wall 1 exceeds 55%, the strength of the honeycomb structure 100 is not enough. When such a honeycomb structure 100 is stored in a can body used for an exhaust-gas purifying apparatus, it is difficult to hold the honeycomb structure 100 with a sufficient grip force. The porosity of the partition wall 1 is a value measured with a mercury porosimeter. For the mercury porosimeter, Micromeritics' AutoPore 9500 (trade name) may be used, for example.

The material of the partition wall 1 is not limited especially. From the viewpoints of strength, heat resistance, durability, and the like, the partition wall 1 is preferably made of various types of ceramics, such as oxides and non-oxides, and metals as major components. Specifically, ceramics include at least one type of materials selected from the group consisting of cordierite, mullite, alumina, spinel, silicon carbide, silicon nitride, and aluminum titanate. Examples of the metals include Fe—Cr—Al based metals and metal silicon. Preferably one type or two types or more selected from these materials may be included as a major component of the partition wall 1. Particularly preferably, one type or two types or more selected from the group consisting of alumina, mullite, aluminum titanate, cordierite, silicon carbide, and silicon nitride is included as a major component from the viewpoints of high strength, high heat resistance, and the like. Silicon carbide or silicon-silicon carbide composite materials are particularly suitable from the viewpoints of high heat conductivity, high heat resistance, and the like. The "major component" refers to a component making up 50 mass % or more of the components, preferably 70 mass % or more, and more preferably 80 mass % or more.

From the viewpoints of strength, heat resistance, durability, and the like, the boundary wall 8 is preferably made of various types of ceramics, such as oxides and non-oxides, and metals as major components. Preferably the boundary wall 8 is made of the same material as the partition wall.

From the viewpoints of strength, heat resistance, durability, and the like, the circumferential wall 3 is preferably made of various types of ceramics, such as oxides and non-oxides, and metals as major components. Preferably the circumferential wall 3 is made of the same material as the partition wall 1. Particularly preferably the partition wall 1, the boundary wall 8, and the circumferential wall 3 of the honeycomb structure 100 are an integrally molded product formed by extrusion at one time.

The overall shape of the honeycomb structure 100 is not limited especially. For the overall shape of the honeycomb structure 100 of the present embodiment, the inflow end face 11 and the outflow end face 12 preferably have a circular shape or an elliptic shape, and particularly preferably have a circular shape. The size of the honeycomb structure 100 is not limited especially, and the length from the inflow end face 11 to the outflow end face 12 is preferably 50 to 254 mm. When the overall shape of the honeycomb structure 100 is a round pillar-shape, their end faces preferably have a diameter of 50 to 254 mm.

The honeycomb structure 100 is preferably used as a member for exhaust-gas purification in an internal combustion engine. In one example, the honeycomb structure is preferably used as a catalyst carrier to be loaded with catalyst for exhaust-gas purification. In the honeycomb structure 100, at least one of the surface of the partition wall 1 and the pores of the partition wall 1 of the honeycomb structure body 4 may be loaded with catalyst for exhaust-gas purification.

Although not shown in the drawings, the honeycomb structure may further include a plugging portion disposed at any one of the ends of the cells defined by the partition wall. The plugging portion is disposed at open ends of the cells at the inflow end face side or the outflow end face side to plug any one of the ends of the cells. The honeycomb structure with such a plugging portion can be used as a filter to remove particulate matters included in exhaust gas.

Figure 5:
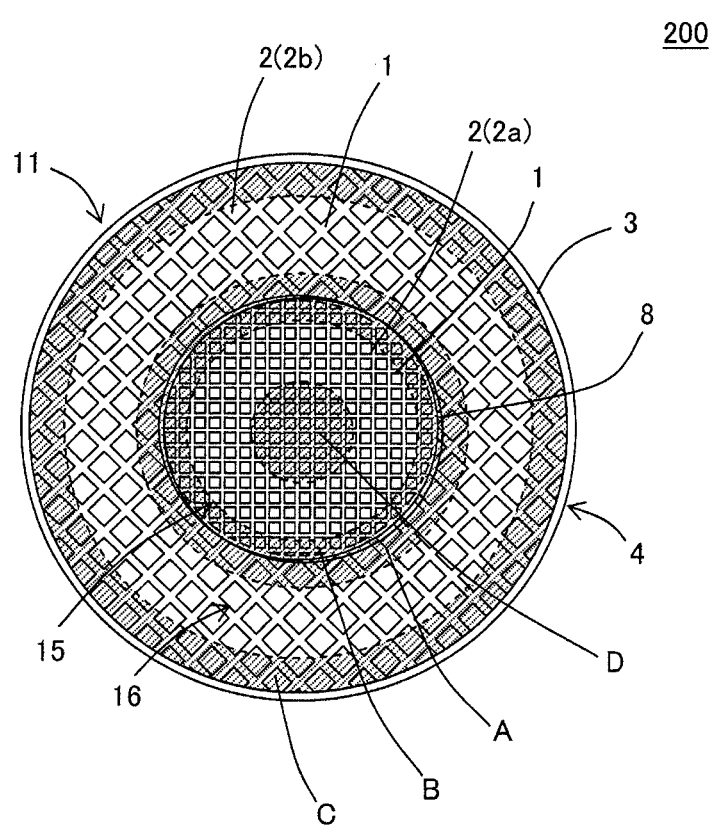
FIG. 5 is a plan view schematically showing an inflow end face of another embodiment of the honeycomb structure of the present invention.

Next the following describes another embodiment of the honeycomb structure of the present invention, with reference to FIG. 5. FIG. 5 is a plan view schematically showing an inflow end face of another embodiment of the honeycomb structure of the present invention.

As shown in FIG. 5, the honeycomb structure 200 of the present embodiment includes a pillar-shaped honeycomb structure body 4 having a porous partition wall 1 and a circumferential wall 3 disposed so as to surround the circumference of the partition wall 1. The honeycomb structure body 4 has a center cell structure 15, a circumferential cell structure 16, and a boundary wall 8 in a plane orthogonal to the extending direction of the cells 2. In this honeycomb structure body 200, the center cell structure 15 and the circumferential cell structure 16 have different cell structures.

The honeycomb structure 200 shown in FIG. 5 further includes third thick intersection parts in the range of distance L3 toward the center from the circumferential wall 3 where the thickness of the intersection parts is larger than the thickness of the circumferential basic intersection parts. FIG. 5 shows the third thick intersection parts in the diagonally hatched region indicated with C.

The honeycomb structure 200 shown in FIG. 5 further includes fourth thick intersection parts in the range of distance L4 outward from the center of gravity O of the plane orthogonal to the extending direction of the cells 2 where the thickness of the intersection parts is larger than the thickness of the center basic intersection parts. FIG. 5 shows the fourth thick intersection parts in the diagonally hatched region indicated with D.

That is, the honeycomb structure 200 of the present embodiment further includes the third thick intersection and the fourth thick intersection in addition to the structure of the honeycomb structure 100 shown in FIG. 1 to FIG. 4 described above. The honeycomb structure 200 of the present embodiment may include either the third thick intersection part or the fourth thick intersection part.

Similarly to the honeycomb structure 100 shown in FIG. 1 to FIG. 4, the honeycomb structure 200 of the present embodiment also has the advantageous effects of having excellent mechanical strength and suppressing clogging of catalyst when the honeycomb structure is loaded with the catalyst.

Preferably the third thick intersection parts are configured similarly to the first thick intersection parts except that the existence range is the distance L3 toward the center from the circumferential wall 3.

Preferably the fourth thick intersection parts are configured similarly to the first thick intersection parts except that the existence range is the distance L4 outward from the center of gravity O of the plane orthogonal to the extending direction of the cells 2.

In the circumferential cell structure 16, the range of distance L3 is preferably 70% or less of the length between the circumferential wall 3 and the boundary wall 8 in the perpendicular direction to the boundary wall 8, and particularly preferably 60 to 70%. The range of distance L3 exceeding 70% of the length between the circumferential wall 3 and the boundary wall 8 is not preferable because of deterioration in temperature-rising property due to the increased weight and increase in pressure loss due to lowering of the open frontal area.

(2) Method for Manufacturing a Honeycomb Structure:

The following describes a method for manufacturing the honeycomb structure of the present invention.

Firstly a kneaded material having plasticity is prepared to produce a honeycomb structure body. The kneaded material to produce a honeycomb structure body can be prepared by adding additives, such as binder, and water as needed to a material selected as raw material powder from the aforementioned materials suitable for the partition wall.

Next, the prepared kneaded material is extruded to produce a pillar-shaped honeycomb formed body having a partition wall defining a plurality of cells and a circumferential wall disposed at the outermost circumference. In the extrusion, a die for the extrusion may have a slit in the reversed shape of the honeycomb formed body to be formed, on the extruding face of the kneaded material. Specifically to manufacture the honeycomb structure of the present invention, a die for the extrusion preferably has a slit so to be different in cell structure between the center part and the circumferential part of the honeycomb formed body to be formed by extrusion. Preferably the die used has an annular slit at the boundary between the center part and the circumferential part having different cell structures. Such an annular slit forms the boundary wall to separate the circumferential cell structure and the center cell structure.

Preferably the honeycomb formed body is manufactured by extrusion so that the finally obtained honeycomb structure has desired thick intersection parts at least at one of the range of distance L1 outward from the boundary wall and the range of distance L2 inward from the boundary wall.

The obtained honeycomb formed body may be dried by microwaves and hot air, for example. A plugging portion may be disposed at the open ends of the cells with a material similar to the material used for manufacturing of the honeycomb formed body.

Next, the obtained honeycomb formed body is fired to obtain a honeycomb structure. The firing temperature and the firing atmosphere differ according to the raw material, and those skilled in the art can select the firing temperature and the firing atmosphere that are the most suitable for the selected material. The method for manufacturing the honeycomb structure of the present invention is not limited to the method as described above.

EXAMPLES

The following describes the present invention more specifically by examples, however, the present invention is not limited at all by the examples.

Example 1

2 parts by mass of dispersing medium and 6 parts by mass of organic binder were added to 100 parts by mass of the cordierite forming raw material, followed by mixing and kneading to prepare a kneaded material. As the cordierite forming raw material, alumina, aluminum hydroxide, kaolin, talc, and silica were used. As the dispersing medium, water was used. As the organic binder, methylcellulose was used. As the dispersing agent, dextrin was used.

Next, the kneaded material was extruded using a die for manufacturing of a honeycomb formed body to obtain a honeycomb formed body having a round pillar shape as the overall shape. The cells of the honeycomb formed body had a quadrangular shape. The formed honeycomb formed body had a circumferential cell structure, a center cell structure, and a boundary wall disposed between the circumferential cell structure and the center cell structure in a plane orthogonal to the extending direction of the cells. The center cell structure and the circumferential cell structure had different cell structures. In the range of a predetermined distance from the boundary wall, the intersection parts of the partition wall were thick so as to dispose the thick intersection parts in the desired range.

Next, the honeycomb formed body was dried by a microwave dryer, and further dried completely by a hot-air drier, and then both end faces of the honeycomb formed body were cut so as to have predetermined dimensions.

Next, the dried honeycomb formed body was degreased and fired to obtain a honeycomb structure of Example 1.

The honeycomb structure of Example 1 had a round pillar shape, where the inflow end face and the outflow end face were round. The inflow end face and the outflow end face had the outer diameter (diameter) of 118.4 mm. The honeycomb structure had the length (overall length) in the cell extending direction of 127 mm. The partition wall of the center cell structure had the thickness of 0.064 mm, and the center cell structure had cell density of 93 cells/cm$^2$. The partition wall of the circumferential cell structure had the thickness of 0.09 mm, and the circumferential cell structure had cell density of 62 cells/cm$^2$. The boundary wall disposed so as to surround the center cell structure had the diameter of 84 mm. The boundary wall had the thickness of 0.3 mm, and the circumferential wall surrounding the circumference of the honeycomb structure had the thickness of 0.3 mm. Table 1 shows the structure of the honeycomb structure of Example 1.

TABLE 1

| | | | center cell structure | | circumferential cell structure | | | | | | presence of reinforced |
|---|---|---|---|---|---|---|---|---|---|---|---|
| | diameter (mm) | overall length (mm) | partition wall thickness (mm) | cell density (cells/cm2) | partition wall thickness (mm) | cell density (cells/cm2) | cell shape | boundary wall diameter (mm) | boundary wall thickness (mm) | circumferential wall thickness (mm) | partition wall near boundary partition wall |
| Comp. Ex. 1 | 118.4 | 127 | 0.09 | 93 | 0.11 | 62 | quadrangle | 84 | 0.3 | 0.3 | no |
| Comp. Ex. 2 | 118.4 | 127 | 0.09 | 93 | 0.11 | 62 | quadrangle | 84 | 0.3 | 0.3 | yes |
| Comp. Ex. 3 | 118.4 | 127 | 0.064 | 93 | 0.09 | 62 | quadrangle | 84 | 0.3 | 0.3 | no |
| Comp. Ex. 4 | 118.4 | 127 | 0.064 | 93 | 0.09 | 62 | quadrangle | 84 | 0.3 | 0.3 | yes |
| Ex. 1 | 118.4 | 127 | 0.064 | 93 | 0.09 | 62 | quadrangle | 84 | 0.3 | 0.3 | no |
| Ex. 2 | 118.4 | 127 | 0.064 | 93 | 0.09 | 62 | quadrangle | 84 | 0.3 | 0.3 | no |
| Ex. 3 | 118.4 | 127 | 0.064 | 93 | 0.09 | 62 | quadrangle | 84 | 0.3 | 0.3 | no |
| Ex. 4 | 118.4 | 127 | 0.064 | 93 | 0.09 | 62 | quadrangle | 84 | 0.3 | 0.3 | no |
| Ex. 5 | 118.4 | 127 | 0.064 | 93 | 0.09 | 62 | quadrangle | 84 | 0.3 | 0.3 | no |
| Ex. 6 | 118.4 | 127 | 0.064 | 93 | 0.09 | 62 | quadrangle | 84 | 0.3 | 0.3 | no |
| Ex. 7 | 118.4 | 127 | 0.064 | 93 | 0.09 | 62 | quadrangle | 84 | 0.3 | 0.3 | no |
| Ex. 8 | 118.4 | 127 | 0.064 | 93 | 0.09 | 62 | quadrangle | 84 | 0.3 | 0.3 | no |
| Ex. 9 | 118.4 | 127 | 0.064 | 93 | 0.09 | 62 | quadrangle | 84 | 0.3 | 0.3 | no |
| Ex. 10 | 118.4 | 127 | 0.064 | 93 | 0.09 | 62 | quadrangle | 84 | 0.3 | 0.3 | no |
| Ex. 11 | 118.4 | 127 | 0.064 | 93 | 0.09 | 62 | quadrangle | 84 | 0.3 | 0.3 | no |
| Ex. 12 | 118.4 | 127 | 0.064 | 93 | 0.09 | 62 | quadrangle | 84 | 0.3 | 0.3 | no |
| Ex. 13 | 118.4 | 127 | 0.064 | 93 | 0.09 | 62 | quadrangle | 84 | 0.3 | 0.3 | no |
| Ex. 14 | 118.4 | 127 | 0.064 | 93 | 0.09 | 62 | quadrangle | 84 | 0.3 | 0.3 | no |
| Ex. 15 | 118.4 | 127 | 0.064 | 93 | 0.09 | 62 | quadrangle | 84 | 0.3 | 0.3 | no |
| Ex. 16 | 118.4 | 127 | 0.064 | 93 | 0.09 | 62 | quadrangle | 84 | 0.3 | 0.3 | no |
| Ex. 17 | 118.4 | 127 | 0.064 | 93 | 0.09 | 62 | quadrangle | 84 | 0.3 | 0.3 | no |
| Ex. 18 | 118.4 | 127 | 0.064 | 93 | 0.09 | 62 | quadrangle | 84 | 0.3 | 0.3 | no |

TABLE 2

| | distance of range with thick intersections | | | | ratio of distance to radius of cell structure | | |
|---|---|---|---|---|---|---|---|
| | L1 (mm) | L3 (mm) | L2 (mm) | L4 (mm) | L1 ratio | L2 ratio | L3 ratio |
| Comp. Ex. 1 | 0.0 | 0.0 | 0.0 | 0.0 | 0% | 0% | 0% |
| Comp. Ex. 2 | 0.0 | 0.0 | 0.0 | 0.0 | 0% | 0% | 0% |
| Comp. Ex. 3 | 0.0 | 0.0 | 0.0 | 0.0 | 0% | 0% | 0% |
| Comp. Ex. 4 | 0.0 | 0.0 | 0.0 | 0.0 | 0% | 0% | 0% |
| Ex. 1 | 0.0 | 0.0 | 17.6 | 0.0 | 0% | 42% | 0% |
| Ex. 2 | 0.0 | 0.0 | 17.6 | 0.0 | 0% | 42% | 0% |
| Ex. 3 | 0.0 | 0.0 | 17.6 | 0.0 | 0% | 42% | 0% |
| Ex. 4 | 15.2 | 0.0 | 0.0 | 0.0 | 90% | 0% | 0% |
| Ex. 5 | 15.2 | 0.0 | 17.6 | 0.0 | 90% | 42% | 0% |
| Ex. 6 | 2.5 | 0.0 | 17.6 | 0.0 | 15% | 42% | 0% |
| Ex. 7 | 15.2 | 0.0 | 5.2 | 0.0 | 90% | 12% | 0% |
| Ex. 8 | 2.5 | 0.0 | 5.2 | 0.0 | 15% | 12% | 0% |
| Ex. 9 | 0.0 | 12.7 | 15.6 | 0.0 | 0% | 37% | 75% |
| Ex. 10 | 0.0 | 12.7 | 15.6 | 20.7 | 0% | 37% | 75% |
| Ex. 11 | 3.8 | 12.7 | 15.6 | 0.0 | 23% | 37% | 75% |
| Ex. 12 | 3.8 | 12.7 | 15.6 | 0.0 | 23% | 37% | 75% |
| Ex. 13 | 3.8 | 12.7 | 15.6 | 0.0 | 23% | 37% | 75% |
| Ex. 14 | 3.8 | 12.7 | 15.6 | 0.0 | 23% | 37% | 75% |
| Ex. 15 | 3.8 | 12.7 | 10.4 | 0.0 | 23% | 25% | 75% |
| Ex. 16 | 3.8 | 12.7 | 10.4 | 0.0 | 23% | 25% | 75% |
| Ex. 17 | 2.5 | 12.7 | 10.4 | 0.0 | 15% | 25% | 75% |
| Ex. 18 | 2.5 | 11.4 | 5.2 | 0.0 | 15% | 12% | 68% |

TABLE 3

| | intersection ratio of intersection parts | | | | | | percentage of intersection | |
|---|---|---|---|---|---|---|---|---|
| | center basic | center L4 thick | boundary wall inside L2 thick | circumferential basic | boundary wall outside L1 thick | circumferential wall near L3 thick | ratio of thick intersection parts to basic intersection ratio | |
| | $CB_{in}$ | | $C_{in}$ | $CB_{out}$ | $C_{out}$ | | $CB_{in}/C_{in}$ | $CB_{out}/C_{out}$ |
| Comp. Ex. 1 | 2 | 2 | 2 | 1.9 | 1.9 | 1.9 | 100% | 100% |
| Comp. Ex. 2 | 2 | 2 | 2 | 1.9 | 1.9 | 1.9 | 100% | 100% |
| Comp. Ex. 3 | 2.1 | 2.1 | 2.1 | 2 | 2 | 2 | 100% | 100% |
| Comp. Ex. 4 | 2.1 | 2.1 | 2.1 | 2 | 2 | 2 | 100% | 100% |
| Ex. 1 | 2.1 | 2.1 | 2.4 | 2 | 2 | 2 | 88% | 100% |
| Ex. 2 | 2.1 | 2.1 | 2.2 | 2 | 2 | 2 | 95% | 100% |
| Ex. 3 | 2.1 | 2.1 | 4.5 | 2 | 2 | 2 | 47% | 100% |
| Ex. 4 | 2.1 | 2.1 | 2.1 | 2 | 2.3 | 2 | 100% | 87% |
| Ex. 5 | 2.1 | 2.1 | 2.3 | 2 | 2.3 | 2 | 91% | 87% |
| Ex. 6 | 2.1 | 2.1 | 2.3 | 2 | 2.3 | 2 | 91% | 87% |
| Ex. 7 | 2.1 | 2.1 | 2.3 | 2 | 2.3 | 2 | 91% | 87% |
| Ex. 8 | 2.1 | 2.1 | 2.3 | 2 | 2.3 | 2 | 91% | 87% |
| Ex. 9 | 2.1 | 2.1 | 2.3 | 2 | 2 | 2.3 | 91% | 100% |
| Ex. 10 | 2.1 | 2.7 | 2.3 | 2 | 2 | 2.3 | 91% | 100% |
| Ex. 11 | 2.1 | 2.1 | 2.3 | 2 | 2.3 | 2.3 | 91% | 87% |
| Ex. 12 | 2.1 | 2.1 | 2.4 | 2.1 | 2.3 | 2.3 | 88% | 91% |
| Ex. 13 | 2.1 | 2.1 | 2.7 | 2.1 | 2.5 | 2.5 | 78% | 84% |
| Ex. 14 | 2.4 | 2.4 | 2.7 | 2.3 | 2.5 | 2.5 | 89% | 92% |
| Ex. 15 | 2.4 | 2.4 | 2.7 | 2.3 | 2.5 | 2.5 | 89% | 92% |
| Ex. 16 | 2.1 | 2.1 | 2.7 | 2 | 2.5 | 2.5 | 78% | 80% |
| Ex. 17 | 2.1 | 2.1 | 2.7 | 2 | 2.5 | 2.5 | 78% | 80% |
| Ex. 18 | 2.1 | 2.1 | 2.7 | 2 | 2.5 | 2.5 | 78% | 80% |

The honeycomb structure of Example 1 had thick intersection parts where the intersection parts were thick in the range of distance L2 indicated in the "distance of range with thick intersection parts" in Table 2. "L1" or "L2" in the "distance of range with thick intersection parts" in Table 2 shows the distance outward or inward from the boundary wall, of the range where thick intersection parts are disposed, in Examples. "L3" in the "distance of range with thick intersection parts" in Table 2 shows the distance toward the center from the circumferential wall, of the range where thick intersection parts are disposed, in Examples. "L4" in the "distance of range with thick intersection parts" in Table 2 shows the distance outward from the center of gravity O of the plane orthogonal to the cell extending direction, of the range where thick intersection parts are disposed in Examples. "L1", "L2", "L3", and "L4" in Table 2 are specified similarly to distance L1, distance L2, distance L3, and distance L4, respectively, described in the above embodiments of the honeycomb structure.

"L1 ratio", "L2 ratio", and "L3 ratio" in the "ratio of distance to radius of cell structure" in Table 2 indicate the ratio of distances L1, L2, and L3, respectively, to the length of the center cell structure and the circumferential cell structure in the radial direction of the cell structures.

For the honeycomb structure of Example 1, the width of the intersection parts in the ranges of "L1", "L2", "L3", and "L4" in Table 2 was measured. The intersection parts at parts other than the above ranges were basic intersection parts, and the width of the basic intersection parts also was measured. The width of an intersection was obtained by imaginarily drawing a maximum inscribed circle of the intersection part of the partition wall and measuring the diameter of the maximum inscribed circle by image analysis. After measuring the width of the intersection part as stated above, the thickness of the partition wall was measured near the middle point of the partition wall connecting this intersection part and another neighboring intersection part. Then the width of the intersection part was divided by the measured thickness of the partition wall to obtain the intersection ratio of the intersection part. Table 3 shows the results. The field of "center basic $CB_{in}$" indicates the intersection ratio of the center basic intersection parts. The field of "center L4 thick" indicates the intersection ratio of the thick intersection parts in the range of distance L4. The field of "boundary wall inside L2 thick $C_{in}$" indicates the intersection ratio of the second thick intersection parts in the range of distance L2. The field of "circumferential basic $CB_{out}$" indicates the intersection ratio of the circumferential basic intersection parts. The field of "boundary wall outside L1 thick $C_{out}$" indicates the intersection ratio of the first thick intersection parts in the range of distance L1. The field of "circumferential wall near L3 thick" indicates the intersection ratio of the thick intersection parts in the range of distance L3. In Table 3, for example, the same value for the "center basic $CB_{in}$" and the "boundary wall inside L2 thick $C_{in}$" means that the structure did not have thick intersection parts in the range of distance L2. That is, for the sake of convenience, Table 3 shows the values in the field of "boundary wall inside L2 thick $C_{in}$" for the structure without thick intersection parts in the range of distance L2 as well. In this case, when the "center basic $CB_{in}$" has the same value, the intersection parts in this range are not thick intersection parts but basic intersection parts. Similarly when the "center L4 thick" and the "center basic $CB_{in}$" have the same value, the intersection parts in this range are basic intersection parts (center basic intersection parts). Similarly, when the "boundary wall outside L1 thick $C_{out}$" and the "circumferential wall near L3 thick" have the same value as the "circumferential basic $CB_{out}$", the intersection parts in these ranges are basic intersection parts (circumferential basic intersection parts).

The field of "percentage of intersection ratio of thick intersection parts to basic intersection ratio" in Table 3 indicates the ratio of the intersection ratio $CB_{in}$ to the intersection ratio $C_{in}$ (i.e., $CB_{in}/C_{in}$) and the ratio of the intersection ratio $CB_{out}$ to the intersection ratio $C_{out}$ (i.e., $CB_{out}/C_{out}$).

The honeycomb structure of Example 1 was evaluated by the following methods about "isostatic strength (MPa)", "catalyst clogging", "pressure loss", "temperature-rising property" and "thermal shock resistance (whether the structure had a breakage or not)". Table 4 shows the result.

TABLE 4

| | isostatic strength | catalyst clogging | pressure loss | temperature-rising property | thermal shock resistance (whether the structure had a breakage or not) |
|---|---|---|---|---|---|
| Comp. Ex. 1 | D | A | 101% | 111.2% | broken |
| Comp. Ex. 2 | A | C | 114% | 122.6% | not broken |
| Comp. Ex. 3 | D | A | 90% | 88.3% | broken |
| Comp. Ex. 4 | A | C | 100% | 100.0% | not broken |
| Ex. 1 | B | A | 91% | 88.8% | not broken |
| Ex. 2 | C | A | 90% | 88.5% | not broken |
| Ex. 3 | B | B | 95% | 97.0% | not broken |
| Ex. 4 | C | A | 92% | 89.1% | not broken |
| Ex. 5 | B | A | 93% | 89.4% | not broken |
| Ex. 6 | B | A | 91% | 88.7% | not broken |
| Ex. 7 | B | A | 92% | 89.2% | not broken |
| Ex. 8 | B | A | 91% | 88.5% | not broken |
| Ex. 9 | B | A | 91% | 89.3% | not broken |
| Ex. 10 | B | A | 91% | 89.7% | not broken |
| Ex. 11 | B | A | 91% | 89.4% | not broken |
| Ex. 12 | B | A | 91% | 89.6% | not broken |
| Ex. 13 | A | A | 92% | 90.9% | not broken |
| Ex. 14 | A | A | 92% | 91.2% | not broken |
| Ex. 15 | A | A | 92% | 91.0% | not broken |
| Ex. 16 | A | A | 92% | 90.6% | not broken |
| Ex. 17 | A | A | 92% | 90.5% | not broken |
| Ex. 18 | A | A | 91% | 90.0% | not broken |

(Isostatic Strength (MPa))

Isostatic strength was measured in accordance with the isostatic breaking strength testing specified at M505-87 of the automotive standard (JASO standard) issued by the Society of Automotive Engineers of Japan, Inc. Isostatic breaking strength is tested by placing a honeycomb structure in a rubber-made tubular container, which is sealed with an aluminum plate, and applying an isostatic pressure thereto in water. Isostatic strength measured by this isostatic breaking strength testing is indicated as a pressure (MPa) applied when the honeycomb structure breaks down. Then the honeycomb structure was evaluated based on the following criteria.

Evaluation A: isostatic strength was 2.0 MPa or higher;
Evaluation B: isostatic strength was 1.5 MPa or higher and less than 2.0 MPa;
Evaluation C: isostatic strength was 1.0 MPa or higher and less than 1.5 MPa; and
Evaluation D: isostatic strength was less than 1.0 MPa.

(Catalyst Clogging)

The honeycomb structures of Examples and Comparative Examples were loaded with catalyst by the following method. 1 kg of water was added to 280 g of γ-alumina with the average particle diameter of 5 μm, followed by wet milling with ball mill. 30 g of alumina sol as binder was added to the obtained milled particles to prepare catalyst slurry. This catalyst slurry was prepared so that the viscosity was 5 mPa·s. Then the honeycomb structure was immersed into the obtained catalyst slurry. After that, the honeycomb structure was taken out of the catalyst slurry, and was dried for 2 hours at 120° C. and was burned for 1 hour at 550° C. to obtain a honeycomb catalyst carrier. After that, light was transmitted from one end face of the obtained honeycomb catalyst carrier, and the number of clogged cells among the cells formed in the honeycomb structure was counted. The clogged cells mean the cells through which the light did not pass, and the clogged cells have clogging of the cells with the catalyst. Then the honeycomb structure was evaluated based on the following criteria.

Evaluation A: no clogged cells;
Evaluation B: clogged cells was 0.05% or less of the total number of cells; and
Evaluation C: clogged cells exceeded 0.05% of the total number of cells.

(Pressure Loss)

Honeycomb structures of Examples and Comparative Examples were loaded with catalyst of 200 g/L using wash coat. After that, pressure loss of these honeycomb structures was measured. Pressure loss was obtained by flowing gas through a honeycomb structure mounted in a cold flow bench at the gas flow rate of 5 m$^3$/min and at 25° C., and then measuring a pressure difference in front of and after the honeycomb structure. The cold flow bench is an apparatus configured to feed air at ambient temperature into the honeycomb structure by a blower, and measure the pressure difference in front of and after the honeycomb structure. Letting that the value of pressure loss of the honeycomb structure of Comparative Example 4 was 100%, the values of pressure loss of the honeycomb structures of Examples and Comparative Examples were obtained. A lower value in Table 4 shows excellent property of pressure loss.

(Temperature-Rising Property)

Heated gas was passed through the honeycomb structures of Examples and Comparative Examples to heat the honeycomb structures, and the heating time until the temperature reached to 400° C. was measured. Before passing gas through the honeycomb structure, the flow rate of the gas was adjusted so that the temperature of the gas was 30° C./sec at the position of 10 mm from the inflow end face. Letting that the value of the time when the honeycomb structure of Comparative Example 4 reached 400° C. was 100%, the temperature-rising time ratios of the value of the time when the honeycomb structures of Examples and Comparative Examples reached 400° C. were obtained.

(Thermal Shock Resistance (Whether the Structure had a Breakage or not))

To evaluate thermal shock resistance of the honeycomb structures of Examples and Comparative Examples, a "propane gas burner apparatus" configured to feed heated gas into the casing storing each honeycomb structure was used. Specifically the honeycomb structure of each of Examples and Comparative Examples was stored (canning) in a can body, and this was set in the propane gas burner apparatus. Next, combustion gas was fed into the honeycomb structure. The combustion gas at the flow rate of 60 NL/min was allowed to flow for 10 minutes, so that the gas temperature at a center part of 10 mm position in front of the honeycomb structure was 1100° C. in 10 minutes. After that, the combustion gas was stopped, and cooling air was allowed to flow instead at the flow rate of 300 NL/min for 10 minutes, so that the gas temperature at the center part of 10 mm position in front of the honeycomb structure was 100° C. in 10 minutes. Such air flowing of the combustion gas and the cooling air was set as one cycle, and 20 cycles were performed. After that, the honeycomb structure was taken out of the propane gas burner apparatus, and a breakage of the honeycomb structure was checked. If any breakage was found in the honeycomb structure, the honeycomb structure was "broken". If no breakage was found, the honeycomb structure was "not broken".

Examples 2 to 18

The honeycomb structures of Examples 2 to 18 were manufactured by the method similar to Example 1 except that the thick intersection parts were changed as shown in Table 2 and Table 3.

Comparative Examples 1 to 4

The honeycomb structures of Comparative Examples 1 to 4 were manufactured by the method similar to Example 1 except that the configuration of these honeycomb structures was changed as shown in Table 1 to Table 3. In Table 1, "presence of reinforced partition wall near boundary partition wall" indicates the presence or not of the following structure. The "reinforced partition wall near boundary partition wall" refers to the structure such that the partition wall near the boundary wall is thicker than the partition wall of the basic structure to keep the strength of the honeycomb structure. In Table 1, when the field of "presence of reinforced partition wall near boundary partition wall" is "yes", the corresponding honeycomb structure has such a structure. The honeycomb structures of Comparative Examples 2 and 4 were configured so that the partition wall was relatively thicker at an inside part and an outside part of near the boundary wall. Specifically Comparative Examples 2 and 4 were configured so that the inside region of the boundary wall corresponding to about three cells had an average thickness of the partition wall that was larger than the partition wall in the center cell structure by 140 μm, and the outside region of the boundary wall corresponding to about five cells had an average thickness of the partition wall that was larger than the partition wall in the circumferential cell structure by 10 μm.

The honeycomb structures of Examples 2 to 18 and Comparative Examples 1 to 4 also were evaluated about "isostatic strength (MPa)", "catalyst clogging", "pressure loss", "temperature-rising property" and "thermal shock resistance (whether the structure had a breakage or not)" by the method similar to Example 1. Table 4 shows the result.

(Results)

The honeycomb structures of Examples 1 to 18 had good results for the evaluations shown in Table 4. On the contrary, the honeycomb structures of Comparative Examples 1 and 3 had low isostatic strength, and had a breakage found during the evaluation of thermal shock resistance. The honeycomb structure of Comparative Example 1 had poor temperature-rising property. The honeycomb structures of Comparative Examples 2 and 4 had catalyst clogging found during the evaluation of catalyst clogging. The honeycomb structure of Comparative Example 2 was poor for both of pressure loss and temperature-rising property. The honeycomb structure of Example 8 had a good result for the evaluation of catalyst clogging because the size of intersection ratio was adjusted relative to the honeycomb structure of Example 3. The honeycomb structure of Example 8 had a good result for temperature-rising property as well because the size of intersection ratio and the region of thick parts were adjusted so as to suppress the weight increase. The honeycomb structure of Example 18 had improved isostatic strength compared with the honeycomb structure of Example 8 because it had thick parts not only at inside and outside of the boundary wall but also at a part near the outer wall. Additionally the honeycomb structure of Example 18 optimally adjusted the size of the intersection ratio in each region of the thick parts as well as the order for size of the regions and the region with thick parts and therefore suppressed deterioration in pressure loss and in temperature-rising property to the minimum resulting from the thick part near the circumferential wall.

INDUSTRIAL APPLICABILITY

The honeycomb structure of the present invention can be used as a catalyst carrier to load a catalyst to purify exhaust gas emitted from a gasoline engine, a diesel engine, and the like, or as a filter to purify exhaust gas.

DESCRIPTION OF REFERENCE NUMERALS

1: partition wall, 2: cell, 2a: cell (cell in center cell structure), 2b: cell (cell in circumferential cell structure), 3: circumferential wall, 4: honeycomb structure body, 5: intersection part, 5a: basic intersection part, 5a1: circumferential basic intersection part, 5a2: center basic intersection part, 5b: thick intersection part, 5b1: first thick intersection part, 5b2: second thick intersection part, 8: boundary wall, 11: inflow end face, 12: outflow end face, 15: center cell structure, 16: circumferential cell structure, 100, 200: honeycomb structure, A: region including first thick intersection parts, B: region including second thick intersection parts, C: region including third thick intersection parts, D: region including fourth thick intersection parts, L1: distance (distance outward from boundary wall), L2: distance (distance inward from boundary wall), L3: distance (distance inward from circumferential wall), L4: distance (distance outward from center of gravity)

What is claimed is:

1. A honeycomb structure comprising a pillar-shaped honeycomb structure body having a porous partition wall defining a plurality of cells which serve as fluid through channel extending from an inflow end face to an outflow end face; and a circumferential wall disposed to surround the circumference of the partition wall, wherein in a plane orthogonal to an extending direction of the cells, the honeycomb structure body has a circumferential cell structure formed in a circumference of the honeycomb structure body, a center cell structure formed in a center part inside of the circumferential cell structure, the center cell structure having a cell structure different from the circumferential cell structure, and a boundary wall disposed at a boundary part between the circumferential cell structure and the center cell structure, the honeycomb structure body has intersection parts of the partition wall, the intersection parts including basic intersection parts and thick intersection parts, the thick intersection parts having a thickness of the intersection parts that is larger than a thickness of the basic intersection parts, the thick intersection parts include at least one of intersection parts including: first thick intersection parts in a range of distance L1 outward from the boundary wall, the first thick intersection parts being thicker than circumferential basic intersection parts that are the basic intersection parts in the circumferential cell structure; and second thick intersection parts in a range of distance L2 inward from the boundary wall, the second thick intersection parts being thicker than center basic intersection parts that are the basic intersection parts in the center cell structure, and in the circumferential cell structure, the intersection parts at least include the circumferential basic intersection parts that are the basic intersection parts, the partition wall of the circumferential cell structure at parts other than the basic intersection part and the thick intersection part has a uniform thickness, the partition wall of the center cell structure at parts other than the basic intersection part and the thick intersection part has a uniform thickness, and in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, the honeycomb structure has intersection parts in the first thick intersection parts that have the intersection ratio of $C_{out}$, and has intersection parts in the second thick intersection parts that have the intersection ratio of $C_{in}$, and the $C_{out}$ and the $C_{in}$ satisfy the relationship of the following expression (1):

$$C_{out} < C_{in} \qquad \text{Expression (1).}$$

2. The honeycomb structure according to claim 1, wherein the thick intersection parts further include third thick intersection parts in a range of distance L3 toward a center from the circumferential wall, the third thick intersection parts being thicker than the circumferential basic intersection parts.

3. The honeycomb structure according to claim 2, wherein in the circumferential cell structure, the range of the distance L3 is 70% or less of a length between the circumferential wall and the boundary wall in a perpendicular direction to the boundary wall.

4. The honeycomb structure according to claim 1, wherein the thick intersection parts further include fourth thick intersection parts in a range of distance L4 outward from a center of gravity O of a plane orthogonal to the extending direction of the cells, the fourth thick intersection parts being thicker than the center basic intersection parts.

5. The honeycomb structure according to claim 1, wherein the honeycomb structure has intersection parts of the circumferential basic intersection parts that have the intersection ratio of $CB_{out}$, and has intersection parts of the center basic intersection parts that have the intersection ratio of $CB_{in}$, and the $CB_{out}$, the $C_{out}$, the $CB_{in}$, and the $C_{in}$ satisfy the relationship of the following expression (2):

$$CB_{out} < CB_{in} < C_{out} < C_{in} \qquad \text{Expression (2).}$$

6. The honeycomb structure according to claim 1, wherein in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, the intersection ratio of the thick intersection parts exceeds 2.2 and is 4.0 or less.

7. The honeycomb structure according to claim 1, wherein in a plane orthogonal to the extending direction of the cells of the honeycomb structure body, a diameter of a maximum inscribed circle that is imaginarily depicted in the intersection part of the partition wall is a width of the intersection part, and a ratio of the width of the intersection part to a thickness of the partition wall is an intersection ratio of the intersection part, and the intersection ratio of the basic intersection parts is 85% or less of the intersection ratio of the thick intersection parts in the same cell structure.

8. The honeycomb structure according to claim 1, wherein in the center cell structure, the range of the distance L2 is 35% or less of a radius of the center cell structure.

9. The honeycomb structure according to claim 1, wherein in the circumferential cell structure, the range of the distance L1 is 20% or less of a length between the circumferential wall and the boundary wall in a perpendicular direction to the boundary wall.

* * * * *